United States Patent [19]

Yano et al.

[11] Patent Number: 5,734,497
[45] Date of Patent: Mar. 31, 1998

[54] CONFOCAL SCANNING MICROSCOPE

[75] Inventors: Nobuyuki Yano, deceased, late of Okazaki, by Michiyo Yano, heir; Katsuyasu Mizuno, Gamagori, both of Japan

[73] Assignee: Nidek Company, Ltd., Gamagori, Japan

[21] Appl. No.: 767,327

[22] Filed: Dec. 16, 1996

[30] Foreign Application Priority Data

Jan. 31, 1996 [JP] Japan .................. 8-038974
Aug. 10, 1996 [JP] Japan .................. 8-227624

[51] Int. Cl.$^6$ .................... G02B 21/00; G02B 26/02
[52] U.S. Cl. .................. 359/368; 359/227; 359/236; 359/388
[58] Field of Search ................... 359/368–369, 359/385–390, 227–236, 900

[56] References Cited

U.S. PATENT DOCUMENTS

| | | | |
|---|---|---|---|
| 4,802,748 | 2/1989 | McCarthy et al. | 359/368 |
| 4,927,254 | 5/1990 | Kino et al. | 359/235 |
| 5,020,891 | 6/1991 | Lichtman et al. | 359/235 |
| 5,083,220 | 1/1992 | Hill | 359/234 |
| 5,099,354 | 3/1992 | Lichtman et al. | 359/389 |
| 5,099,363 | 3/1992 | Lichtman | 359/368 |
| 5,307,203 | 4/1994 | Hill | 359/368 |
| 5,351,150 | 9/1994 | Lichtman et al. | 359/389 |
| 5,428,475 | 6/1995 | Tanaami et al. | 359/368 |

*Primary Examiner*—Thong Nguyen
*Attorney, Agent, or Firm*—Oliff & Berridge PLC

[57] ABSTRACT

A confocal scanning microscope comprises rotational disk having numerous pinholes arranged at positions that are conjugate with respect to an object to be observed, illumination optical system for implementing the pinhole-illumination for the object to be observed through the rotational disk, and observation optical system for conducting a reflected light beam from the illuminated object to be observed through the rotational disk and focuses the light beam to form an image for observation at a position that is conjugate with respect to the rotational disk, wherein the pinholes of the rotational disk are in equiangular arrangement on a parabolic spiral. The number of loops M of the parabolic spiral and the number of equiangular divisions in one round of the parabolic spiral at which the pinholes are located have any of relations: M:N=1:2, 3:2, 5:2, . . . , (2i–1):2, where i is an integer.

6 Claims, 6 Drawing Sheets a = 100
Δθ = 6°
Δψ = 4° a = 40
Δθ = 6°
Δψ = 4°

ROTATION CENTER

ROTATION CENTER

PATTERN 1  PATTERN 2

EFFECTIVE REGION

ROTATION CENTER

FIG. 9

|  | REGION A | REGION B |
|---|---|---|
| a | 77.07 | 57.98 |
| M | 1940 | 2185 |
| N | 3880 | 4370 |
| q | 300 | 450 |
| $r_{min}$ | 48 | 34.5 |
| $r_{max}$ | 61 | 47.5 |
| PINHOLE DIAMETER | ⌀ 45 μm | ⌀ 25 μm |
| AVERAGE PINHOLE SPACING | (0.15) | (0.10) |
| TOTAL NUMBER OF PINHOLES | (285800) | (481895) |

CONFOCAL SCANNING MICROSCOPE

BACKGROUND OF THE INVENTION

1. Field of the Invention

The present invention relates to a confocal scanning microscope, and more particularly, it relates to the sophisticated arrangement of numerous pinholes formed on the rotational disk of a confocal scanning microscope.

2. Description of Related Art

There is known a confocal scanning microscope having a rotational disk, with numerous pinholes being formed on the surface thereof, disposed at the conjugate position between an object to be observed and the image forming plane. These pinholes function as a diaphragm for illumination and observation, and only a light beam reflected within a portion of the object plane that is conjugate with the plane of the rotational disk passes through a pinhole and focuses on the image forming plane. Although an image derived from a pinhole is formed on the image forming plane, turning the disk fast enough enables the observer to see the entire view field. The confocal scanning microscope is advantageous in producing a high-resolution and high-contrast observation image as compared with the usual optical microscope.

The rotational disk used in the confocal scanning microscope is named "Nipkow disk" after the inventor, and conventionally pinholes have been arranged based on the equiangular division on an Archimedean spiral. This pinhole arrangement provides a constant rate of variation of the distance of pinholes from the disk rotation center, and therefore produces an observation image by virtually uniform scanning when the disk is turned fast. Another conventional pinhole arrangement proposed is based on the equidistant division on an Archimedean spiral.

However, the former pinhole arrangement by equiangular division on an Archimedean spiral has the smaller distribution density of pinholes as the distance of a disk position from the rotation center increases, therefore it results in such problem that a quantity of light at the outer section of the disk is reduced. That is, uneven brightness is caused across the observation image.

The latter pinhole arrangement by equidistant division on an Archimedean spiral, which provides a virtually constant pinhole distribution density and thus a virtually uniform quantity of light, however it encounters the difficulty in formulating the pinhole arrangement with a simple expression, and therefore it results in such problem that the manufacturing of disks is not easy.

SUMMARY OF THE INVENTION

The present invention has been made in view of the above circumstances and has an object to overcome the above problems and to provide a confocal scanning microscope having a pinhole disk which accomplishes the uniform brightness and uniform scanning.

Another object of this invention is to provide a confocal scanning microscope which allows the easy manufacturing of pinhole disks based on the simple formulation of various pinhole arrangements.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the present invention, as embodied and broadly described herein, a confocal scanning microscope of this invention comprises rotational disk having numerous pinholes arranged at positions that are conjugate with respect to an object to be observed, illumination optical system for implementing the pinhole-illumination for the object to be observed through the rotational disk, and observation optical system for conducting a reflected light beam from the illuminated object to be observed through the rotational disk and focuses the light beam to form an image for observation at a position that is conjugate with respect to the rotational disk, wherein the pinholes of the rotational disk are in equiangular arrangement on a parabolic spiral.

In the case of the confocal scanning microscope, wherein the number of loops M of the parabolic spiral and the number of equiangular divisions N in one round of the parabolic spiral at which the pinholes are located have any of relationships:

$$M:N = 1:2,\ 3:2,\ 5:2,\ \ldots,\ (2i-1):2,$$

where $i$ is an integer.

According to the present invention, it is capable of accomplishing pinhole arrangements on rotational disks that ensures the uniform illumination and uniform scanning.

Additionally, owing to the expression of individual pinhole arrangements by the simple expressions, the manufacturing of rotational disks is made extremely easily.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

FIG. 9 is a view showing desired values of the design parameters for making pinhole arrangements in regions A and B of pinholes.

DETAILED DESCRIPTION OF THE PREFERRED EMBODIMENTS

The accompanying drawings, which are incorporated in and constitute a part of this specification, illustrate embodiments of the present invention and, together with the description, serve to explain the objects, advantages and principles of the invention.

[Embodiment 1]

Optical system

Figure 1:
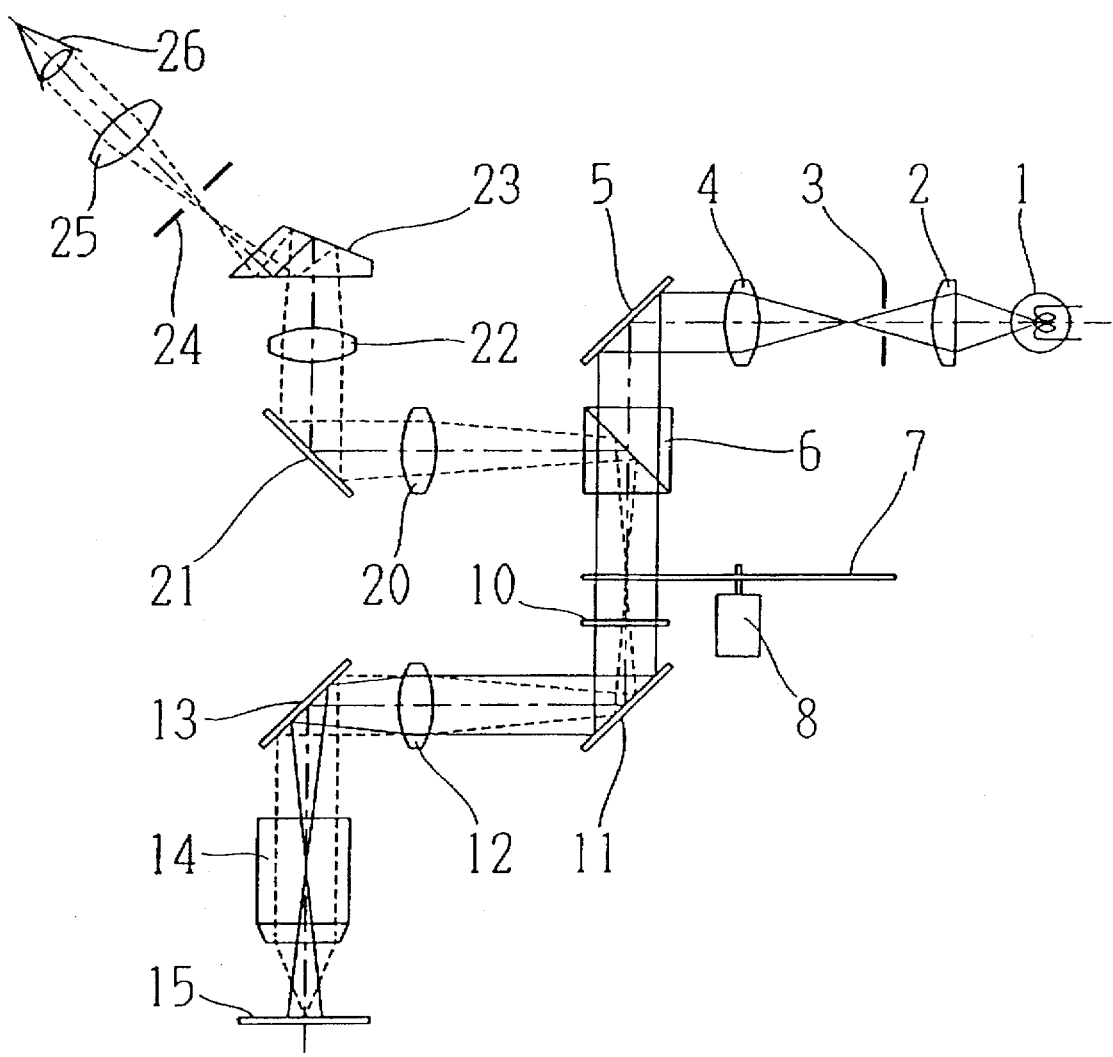
FIG. 1 is a view showing a schematic arrangement of an optical system of a confocal scanning microscope of the preferred embodiment of the present invention.

The optical system of a confocal scanning microscope of this embodiment will be explained by dividing it into its illumination optical system and observation optical system with reference to FIG. 1.

(Illumination optical system)

Reference numeral 1 denotes an illumination light source, reference numeral 2 denotes a condenser lens, reference numeral 3 denotes a diaphragm, reference numeral 4 denotes a convex lens, and reference numeral 5 denotes a mirror. Reference numeral 6 denotes a polarizing beam splitter for rectifies the illumination light beam emitted from the illumination light source 1 into a linearly-polarized light beam, and for reflecting the reflected observation light beam from below-mentioned object 15 to be observed toward an eyepiece 25.

Reference numeral 7 denotes a rotational disk which is made to turn fast by a motor 8. The rotational disk 7 is made of opaque material that has the below-mentioned formation of numerous pinholes arranged on a spiral. A disc plate of the rotational disk 7 is located at the conjugate position between the object 15 to be observed and a field stop 24 in the observation optical system.

Reference numeral 10 denotes a quarter-wave (λ/4) plate converts the illumination light beam, which has been formed into the linearly-polarized light by the beam splitter 6 and has passed through the pinholes of the rotational disk 7, into a circularly-polarized light beam and converts the reflected observation light beam from the object 15 to be observed into a linearly-polarized light beam having a polarization axis orthogonal to the illumination light beam.

Reference numeral 11 and 13 denotes mirrors for diverting the light path, reference numeral 12 denotes a relay lens and reference numeral 14 denotes an objective lens. Reference numeral 15 denotes a object to be observed that is placed on a stage not shown.

(Observation optical system)

The observation optical system shares the polarizing beam splitter 6 through the objective lens 14 with the illumination optical system. And reference numeral 20 denotes a relay lens, reference numeral 21 denotes a mirror, reference numeral 22 denotes a focusing lens, reference numeral 23 denotes a prism, reference numeral 24 denotes the field stop, and reference numeral 25 denotes the eyepiece. Observer's eye is indicated by reference numeral 26.

Pinhole arrangement on the rotational disk

The arrangement of pinholes of the rotational disk 7 will be described hereinafter.

(a) Spirals for pinhole arrangement

A spiral is drawn based on the expression $r=a\theta^k$, where r is the distance of a disk position from the disk rotation center, a is a constant, and k is an exponent which determines the type of the spiral. In the case of k=1, it gives an Archimedean spiral, and in the case of k=½, it gives a parabolic spiral.

Figure 2:
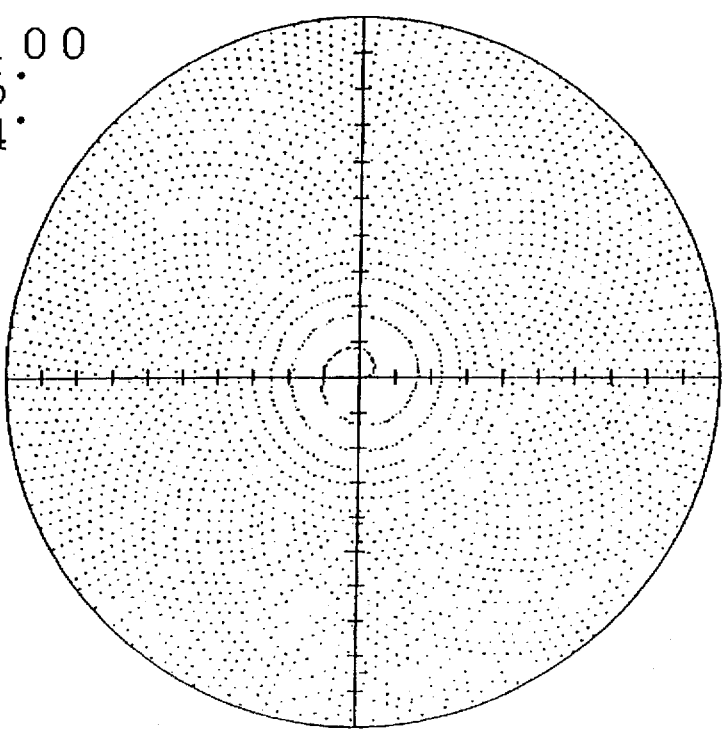
FIG. 2 is a view showing a result of simulation for pinhole arrangement on a parabolic spiral.
Figure 3:
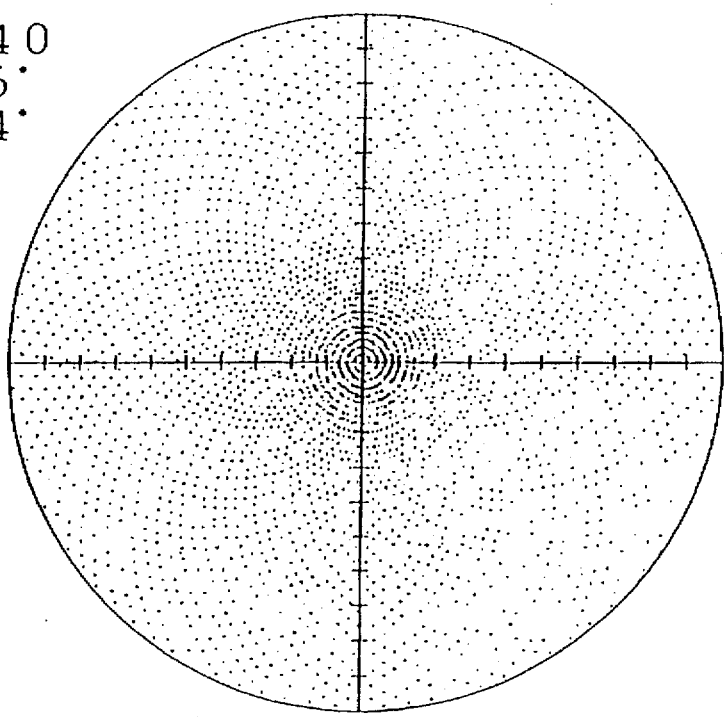
FIG. 3 is a view showing a result of simulation for pinhole arrangement on an Archimedean spiral.

FIG. 2 shows the plots of pinhole arrangement resulting from the calculation of the expression of the parabolic spiral $r=a\theta^{1/2}$ with a=100, an angular step of pinholes ($\Delta\theta$) of 6°, and an angular step of spiral loops ($\Delta\psi$) of 4°. FIG. 3 shows the plots of pinhole arrangement resulting from the calculation of the expression of the Archimedean spiral $r=a\theta$ with a=40, an angular step of pinholes $\Delta\theta$ of 6°, and an angular step of spiral loops $\Delta\psi$ of 4°. Comparing FIG. 2 and FIG. 3 reveals that the parabolic spiral has its loop interval narrowed as the value of r increases, suggesting that a much more uniform pinhole distribution density achieved even in the case of equiangular arrangement.

(b) Pinhole arrangement on parabolic spiral loops

In the case of pinhole arrangement on multiple loops of a parabolic spiral on the entire disk surface, pinholes having small spacings with adjacent pinholes are liable to be affected by neighboring pinhole light beams, resulting in a degraded image contrast. By arranging pinholes such that each pinhole is surrounded by adjacent pinholes in hexagonal configuration, it is possible to allow largest possible spacings between adjacent pinholes, while having a high-density distribution of pinholes.

Therefore simulation for pinhole arrangement was conducted repeatedly by varying the angular step of pinholes $\Delta\theta$ and angular step of spiral loops $\Delta\psi$ so that pinholes may have an approximate hexagonal configuration. It was found that an approximate hexagonal pinhole configuration is attained when the parameters $\Delta\theta$ and $\Delta\psi$ are related to each other as follows.

$$\Delta\theta:\Delta\psi=1:2, 3:2, 5:2, \ldots, (2i-1):2, \qquad (1)$$

(where i is an integer)

These sets of the related parameters $\Delta\theta$ and $\Delta\psi$ produce virtually the same pinhole arrangement.

This relationship of the parameters $\Delta\theta$ and $\Delta\psi$ is equivalent to another relationship between the number of divisions N of one loop of the spiral with an angular step of pinholes of $\Delta\theta$ and the number of spiral loops M with an angular step of spiral loops of $\Delta\psi$, as follows.

$$M:N=1:2, 3:2, 5:2, \ldots, (2i-1):2, \qquad (2)$$

(where i is an integer)+tm (2)

(c) Determination of effective region of disk surface

Figure 4:
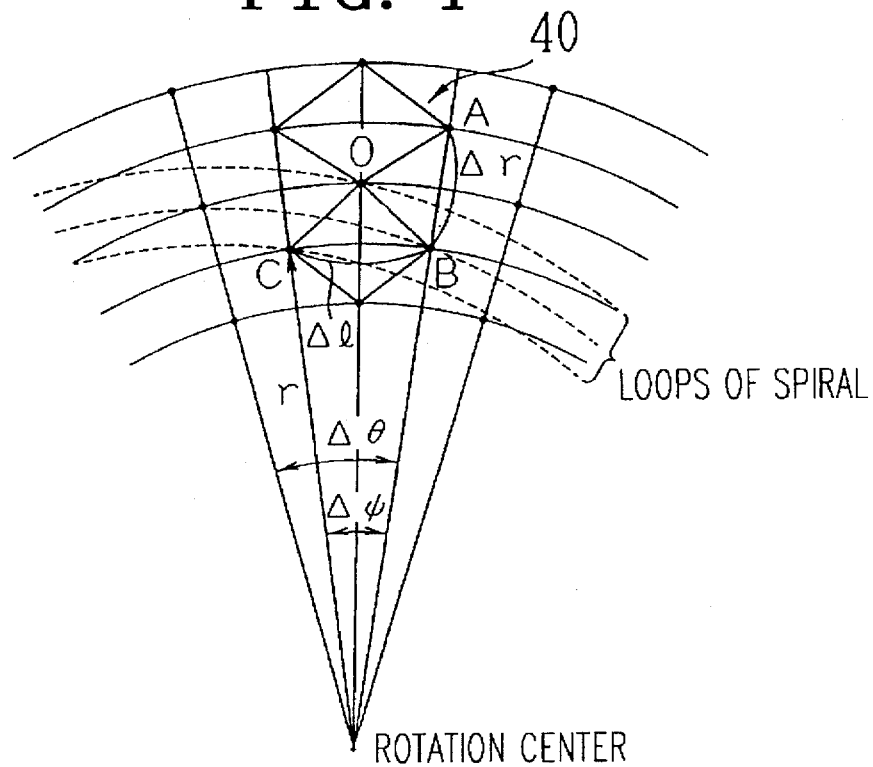
FIG. 4 is a view for illustrating pattern 1 of a hexagonal pinhole configuration on loops of a parabolic spiral.
Figure 5:
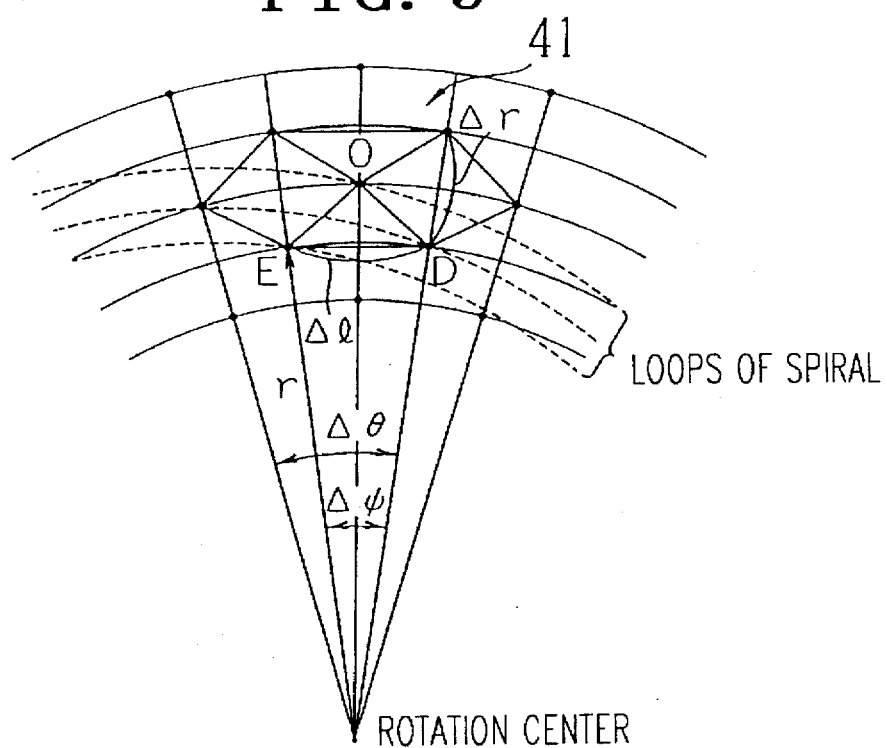
FIG. 5 is a view for illustrating pattern 2 of a hexagonal pinhole configuration on loops of a parabolic spiral.
Figure 6:
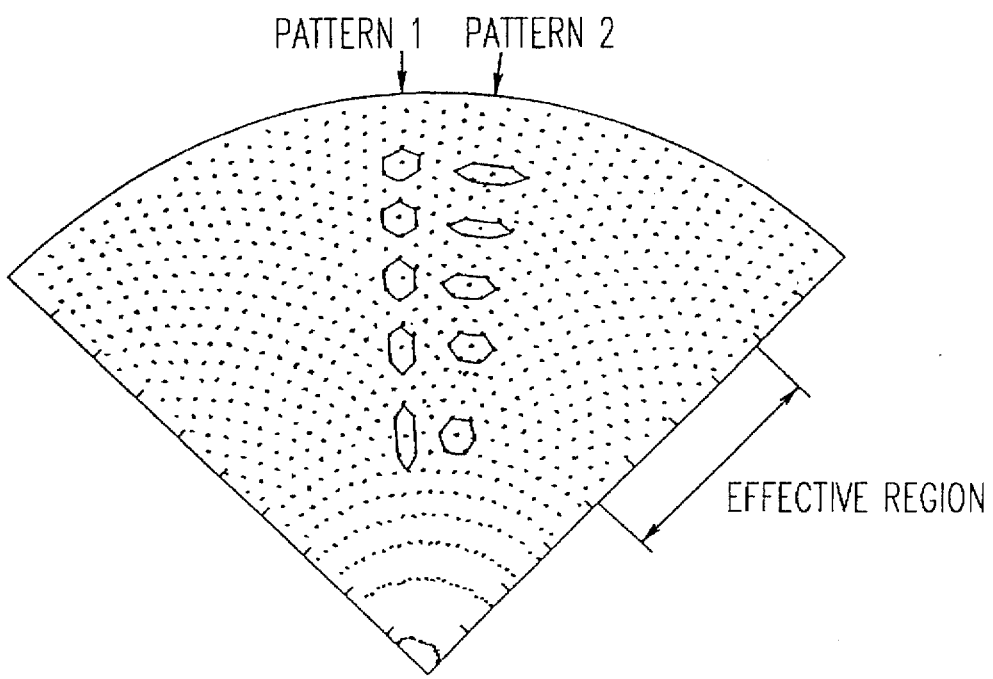
FIG. 6 is a view showing examples of hexagonal pinhole configurations on the disk derived from the pattern 1 and pattern 2.

In consideration of the pinhole arrangement on a rotational disk, there are two cases of pinhole hexagonal configuration on loops of the parabolic spiral as shown as a hexagon 40 (pattern 1) in FIG. 4 and a hexagon 41 (pattern 2) in FIG. 5. FIG. 6 shows part of the disk surface, with sets of the hexagonal patterns 1 and 2 being drawn. The pattern 1 is more elongated in the radial direction as the position is closer to the disk rotation center, while the pattern 2 is more elongated in the circumferential direction as the position is closer to the disk edge.

The effective region of pinholes in optical use is determined so that the shapes of the patterns 1 and 2 are balanced. Specifically, the effective disk region is determined so as to have an upper-limit at which the pattern 1 is most approximate to a regular hexagon and a lower-limit at which the pattern 2 is most approximate to a regular hexagon.

Pattern 1 (FIG. 4)

The condition for the hexagonal pattern 40 to have an approximate regular triangle $\Delta OAB$ with apexes located at pinhole positions 0, A and B in FIG. 4 is given in terms of the distance $\Delta r$ between the pinhole positions A and B and the distance $\Delta l$ between the pinhole positions C and B, as follows.

$$\Delta l=\sqrt{3}\Delta r \qquad (3)$$

For the distance r of the position B or C from the disk rotation center, $\Delta l$ is expressed approximately as follows.

$$\Delta l=r\Delta\psi \qquad (4)$$

The distance $\Delta r$ is expressed by differentiating the expression of the parabolic spiral $r=a\theta^{1/2}$ with $\Delta\theta$ as follows.

$$\Delta r=(a^2/r)\Delta\theta \qquad (5)$$

Pattern 2 (FIG. 5)

Similarly, the condition for the hexagonal pattern 41 to have an approximate regular triangle ΔODE with apexes located at pinhole positions 0, D and E in FIG. 5 is given as follows.

$$\Delta l = (1/\sqrt{3})\Delta r \tag{6}$$

The distances $\Delta l$ and $\Delta r$ and angles $\Delta \psi$ and $\Delta \theta$ are related as expressed by the expressions (4) and (5) for the pattern 1.

(d) Specific manner of pinhole arrangement

Initially, the pinhole spacings ($\Delta r$ and $\Delta l$), the position of field center, and the distance of a field region from the disk rotation center are set. Proper pinhole spacings are determined depending on the pinhole diameter. The effective disk region mentioned previously and its central position are adopted for the field region and the position of field center.

Subsequently, the angular step of pinholes $\Delta \theta$, the angular step of spiral loops $\Delta \psi$, and the constant a of the parabolic spiral are determined based on the above settings.

(A) The angular step of spiral loops $\Delta \psi$ is calculated based on the expression (4): $\Delta \psi = \Delta l/r$.

(B) The angular step of pinholes $\Delta \theta$ is given in terms of $\Delta l$ and $r$ by choosing a proper ratio of $\Delta \theta$ to $\Delta \psi$ of the expression (1).

(C) The constant a of the parabolic spiral is given by the expression (5): $a=(r\Delta r/\Delta \theta)^{1/2}$.

Figure 7:
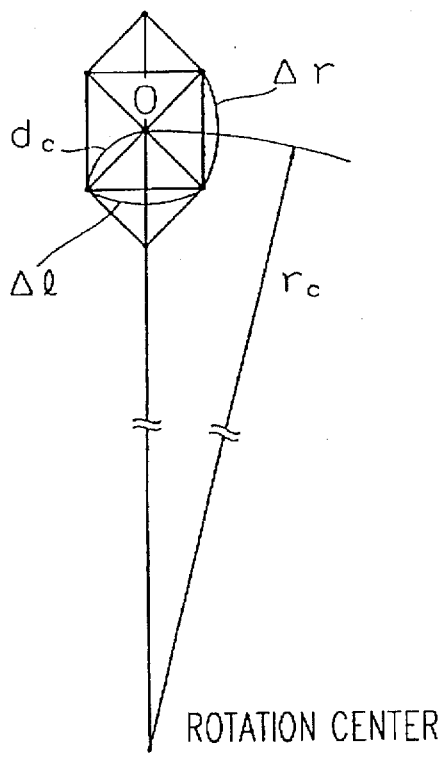
FIG. 7 is a view showing the hexagonal pinhole configuration having virtually equal distances $\Delta r$ and $\Delta l$ at the position of field center.

The values of $\Delta r$ and $\Delta l$ are virtually equal at the field center position, and $\Delta l$ is expressed in terms of the shortest distance $d_c$ of pinholes from the point 0 (see FIG. 7) as follows.

$$\Delta l = \Delta r = \sqrt{2} d_c \tag{7}$$

The $\Delta \psi$ of the item (A) is expressed in terms of the number of spiral loops M as follows.

$$M = 2\pi/\Delta \psi = 2\pi r_c/(\sqrt{2} d_c) \tag{8}$$

Similarly, the $\Delta \theta$ of the item (B) is expressed in terms of the number of divisions N of one round of the spiral and the selected ratio P of $\Delta \theta/\Delta \psi$ of the expression (1) as follows.

$$N = M/P \tag{9}$$

The constant a of the parabolic spiral of the item (C) can also be expressed as follows.

$$a = r_c(1/P)^{1/2} \tag{10}$$

Accordingly, by setting the field center distance $r_c$, the shortest pinhole distance (pinhole spacing) $d_c$ for the field center distance $r_c$ and the M to N ratio P, the design parameters for determining the pinhole arrangement on a parabolic spiral including the constant a, the number of spiral loops M and the number of divisions N of one round of the spiral can be evaluated.

In order for the pinholes of the rotating disk to be scanned at a constant interval, the xy coordinates of pinholes with respect to the origin at the disk rotation center are expressed in terms of the resulting parameters a, M and N, as follows.

$$x = r \cos[2\pi n/N + 2\pi m(1 + 1/N)/M] \tag{11}$$

$$y = r \sin[2\pi n/N + 2\pi m(1 + 1/N)/M] \tag{12}$$

$$r = a[2\pi n/N + 2\pi m/(N*M)]^{1/2} \tag{13}$$

where n is a number indicating the order of equiangular pinhole arrangement on a loop of the parabolic spiral counted from the center, and m is a number indicating the order of the spiral loop. The allowable ranges of these integers n and m are given in terms of the field center distance $r_c$ from the disk rotation center, the lower-limit distance $r_{min}$ from the rotation center and the upper-limit distance $r_{max}$ from the rotation center, as follows.

$$(N/4\pi)^*(r_{min}/r_c)^2 \leq n \leq (N/4\pi)^*(r_{max}/r_c)^2 \tag{14}$$

$$0 \leq m < M \tag{15}$$

Based on the expressions (9) and (10), the constant a in the expression (13) can be expressed in terms of M and N as follows.

$$a = r_c(N/M)^{1/2} \tag{16}$$

The expressions (11), (12) and (13) include a term 1/(N*M) of correction so that the (n+1)th pinhole on the first spiral loop and the n-th pinhole on the M-th spiral loop coincide when the spiral arrangement is turned by $2\pi$. Consequently, the pinhole arrangement has a dual spiral structure, making the scanning more uniform.

The number of pinholes on one spiral loop is $n_{max} - n_{min} + 1$ and the number of spiral loops is M, and accordingly the total number of pinholes on the rotational disk is evaluated to be $M(n_{max} - n_{min} + 1)$.

In this manner, the pinhole arrangement can be expressed by setting the field center position (distance from the disk rotation center) $r_c$ and the shortest pinhole distance (pinhole spacing) $d_c$ for the field center distance $r_c$. A crude disk is processed to form pinholes based on the numerical control in accordance with the expressions of pinhole arrangement.

An appropriate pinhole radius D is determined depending on the wavelength $\lambda$ of the light source and the numerical aperture of the objective lens on the image side $NA_{imag}$ as $D = 0.25*\lambda/NA_{imag}$. The pinhole spacing $d_c$ is set within the range of 10 to 30 times the pinhole diameter, therefore it is set smaller for the observation of a plane object, or it is set larger for the observation of an object surface having intermediate transmissible elements along the optical axis. Too small pinhole spacing is liable to invite the influence of neighboring pinhole light beams, resulting in a degraded image contrast.

Next, the operation of the confocal scanning microscope having the rotational disk 7, with pinholes being arranged as described above, will be explained.

Rays of light produced by the illumination light source 1 is shaped into a light beam by the condenser lens 2, diaphragm 3 and convex lens 4, and it is diverted by the mirror 5 and is incident to the polarizing beam splitter 6. The illumination light beam, which is rectified into a linearly-polarized light beam at the passage through the beam splitter 6, irradiates the rotational disk 7. The light beam coming out of pinholes of the disk 7 goes through the quarter-wave plate 10, and a resulting circularly-polarized light beam is conducted by the mirror 11, relay lens 12, mirror 13 and objective lens 14 and projected onto the surface of the object 15 to form multiple pinhole images on it. Because of a virtually uniform distribution density of pinholes of the disk 7, the target region of the object surface is illuminated to have a virtually uniform brightness.

The reflected circularly-polarized light beam from the observation surface of the object 15 goes back through the optical system, and it is converted into a linearly-polarized light beam when it goes through the quarter-wave plate 10. The light beam has its polarization axis rotated by 90° relative to the polarization axis of the linearly-polarized illumination light beam produced by the polarizing beam splitter 6. The linearly-polarized light beam focuses on the plane of the rotational disk 7 and goes through a pinhole that the illumination light beam has passed through. The light beam coming out of the pinhole and having a polarization axis orthogonal to the linearly-polarized illumination light beam is reflected by the polarizing beam splitter 6. Although the polarizing beam splitter 6 also receives the reflected illumination light from the surface of the rotational disk 7, this reflected light beam without the change of its polarization axis is not reflected by the polarizing beam splitter 6 and therefore it is not directed to the observer's eye.

The reflected light beam from the polarizing beam splitter 6 is conducted by the relay lens 20, mirror 21 and prism 23, and focused by the focusing lens 22 to form an intermediate image at the field diaphragm 24. The observer's eye 26 views the image through the eyepiece 25. Namely, a return light beam from a certain area of the object 15 illuminated by a pinhole goes back through the same pinhole and reaches the observer's eye. Individual pinholes are scanned at a constant interval, while the rotational disk 7 is turned fast by the motor 8, and the observer's eye can view the whole observation surface of the object produced by uniform scanning.

As a variant optical device disposition, if the illumination light beam, which has passed through the quarter-wave plate 10, is reflected by the relay lens 12 and is incident to the observation optical system, the quarter-wave plate 10 may be placed on the other side of the relay lens 12 (between the mirror 13 and the objective lens 14) so as to eliminate the influence.

[Embodiment 2]

In contrast to the pinhole arrangement of the foregoing first embodiment in which the (n+1)th pinhole on the first spiral loop and the n-th pinhole on the M-th spiral loop coincide when the spiral arrangement is rotated by $2\pi$ (one round), the second embodiment is modified such that the (n+q)th pinhole on the first spiral loop and the n-th pinhole on the M-th spiral loop coincide (where the value of q is selected in relation with the disk turning speed and the pattern of pinhole arrangement). By setting the value q to have its absolute value greater than 1, a microscope having a rotational disk with the pinhole arrangement based on the expressions (11), (12) and (13) of the first embodiment is capable of attaining the same uniformity of scanning even in case the disk turning speed is lowered in proportion to the value of q.

The xy coordinates of pinhole arrangement of this embodiment is expressed as follows.

$$x = r \cos[2\pi\{n/N + m/M + mq/(MN)\}] \quad (17)$$

$$y = r \sin[2\pi\{n/N + m/M + mq/(MN)\}] \quad (18)$$

$$r = a[2\pi\{n/N + mq/(MN)\}]^{1/2} \quad (19)$$

The allowable range of n is given as follows.

$$N[r_{min}^2/2\pi a^2 - mq/(MN)] \leq n \leq N[r_{max}^2/2\pi a^2 - mq/(MN)] \quad (20)$$

The allowable range of m is the same as given by the expression (15), and q has a non-zero value.

Figure 8:
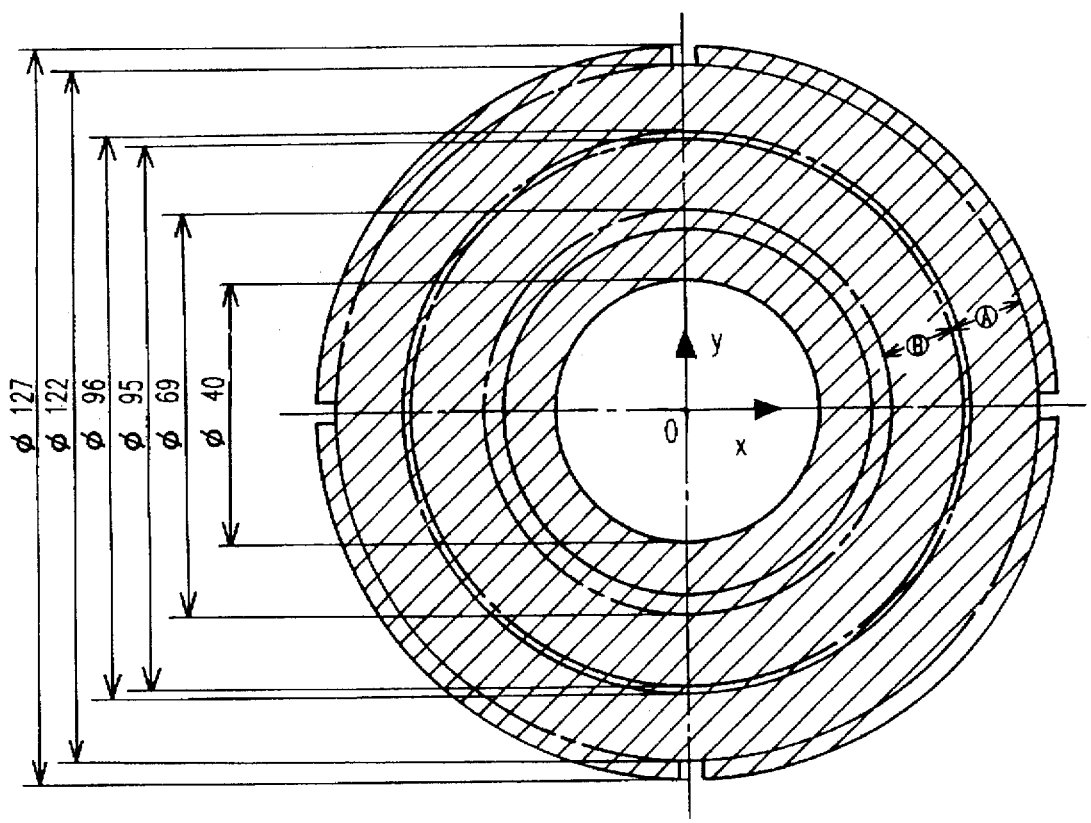
FIG. 8 is a view showing an example of etching pattern used for manufacturing a rotational disk 7.

FIG. 8 and FIG. 9 show an example of the rotational disk 7 having the pinhole arrangements based on this embodiment. The rotational disk is made of a glass plate, with pinholes being formed on its chrome-coated surface by the etching process. FIG. 8 shows the etching pattern, with the etched portion being indicated by hatching. The disk has an outer annular region A and inner annular region B, in which pinholes are formed in different diameters and arrangements based on the settings listed in FIG. 9.

The inventors of the present invention tried to observe objects through the annular regions A and B arbitrarily by turning the rotational disk at 1700 rpm by a motor, and confirmed the observation performance based on the uniform illumination and uniform scanning. The annular region A having the larger pinhole diameter is used for the observation with the intention of enhanced brightness, and the annular region B having the smaller pinhole diameter is used for the observation with the intention of enhanced resolution. The disk drive mechanism is designed so that these annular regions are positioned to the light path selectively.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications are suited to the particular use contemplated. It is intended that the scope of the invention be defined by the claims appended hereto, and their equivalents.

What is claimed is:

1. A confocal scanning microscope comprising:
   a rotational disk having numerous pinholes arranged at positions that are conjugate with respect to an object to be observed;
   an illumination optical system for implementing pinhole-illumination of the object to be observed through said rotational disk; and
   an observation optical system for conducting a reflected light beam from the illuminated object to be observed through said rotational disk and focusing the light beam to form an image for observation at a position that is conjugate with respect to said rotational disk,
   wherein said pinholes of said rotational disk are in an equiangular arrangement on a parabolic spiral and a number of loops M of the parabolic spiral and a number of equiangular divisions N in one round of the parabolic spiral at which said pinholes are located have any of relationships:

$$M:N = 1:2, 3:2, 5:2, \ldots, (2i-1):2,$$

where i is an integer.

2. A confocal scanning microscope according to claim 1, wherein said rotational disk has an arrangement of pinholes with a relatively large diameter in an outer annular region and pinholes with a relatively small diameter in an inner annular region.

3. A confocal scanning microscope, comprising:
   a rotational disk having numerous pinholes arranged at positions that are conjugate with respect to an object to be observed;
   an illumination optical system for implementing pinhole-illumination of the object to be observed through said rotational disk; and
   an observation optical system for conducting a reflected light beam from the illuminated object to be observed through said rotational disk and focusing the light beam to form an image for observation at a position that is conjugate with respect to said rotational disk, wherein said pinholes of said rotational disk are in an equiangular arrangement on a parabolic spiral and a number of loops M of the parabolic spiral and a number of equiangular divisions N in one round of the parabolic spiral at which said pinholes are located have any of relationships:

$$M:N=1:2, 3:2, 5:2, \ldots, (2i-1):2,$$

where i is an integer and wherein xy coordinates of the pinholes arranged on said rotational disk are given by expressions:

$$x=r \cos [2\pi n/N+2\pi m(1+1/N)/M],$$

$$y=r \sin [2\pi n/N=2\pi m(1+1/N)/M],$$

and $$r=a[2\pi n/N+2\pi m/(N*M)]^{1/2}$$

where n and m are integers, with their allowable ranges being given in terms of the field center distance $r_c$ from the rotation center of said rotational disk, the lower-limit distance $r_{min}$ of coordinates from the disk rotation center, and the upper-limit distance $r_{max}$ of coordinates from the disk rotation center, as:

$$(N/4\pi)*(r_{min}/r_c)^2 \leq n \leq (N/4\pi)*(r_{max}/r_c)^2,$$

and $$0 \leq m < M,$$

and where a is:

$$a=r_c(N/M)^{1/2}.$$

4. A confocal scanning microscope according to claim 3, wherein said rotational disk has an arrangement of pinholes with a relatively large diameter in an outer annular region and pinholes with a relatively small diameter in an inner annular region.

5. A confocal scanning microscope, comprising:
 a rotational disk having numerous pinholes arranged at positions that are conjugate with respect to an object to be observed;
 an illumination optical system for implementing pinhole-illumination of the object to be observed through said rotational disk; and
 an observation optical system for conducting a reflected light beam from the illuminated object to be observed through said rotational disk and focusing the light beam to form an image for observation at a position that is conjugate with respect to said rotational disk,
 wherein said pinholes of said rotational disk are in an equiangular arrangement on a parabolic spiral and a number of loops M of the parabolic spiral and a number of equiangular divisions N in one round of the parabolic spiral at which said pinholes are located have any of relationships:

$$M:N=1:2, 3:2, 5:2, \ldots, (2i-1):2,$$

where i is an integer and wherein xy coordinates of the pinholes arranged on said rotational disk are given by expressions:

$$x=r \cos [2\pi\{n/N'm/M+mq/(MN)\}],$$

$$y=r \sin [2\pi\{n/N+m/M+mq/(MN)\}],$$

and $$r=a[2\pi\{n/N+mq/(MN)\}]^{1/2}$$

where n and m are integers, with their allowable ranges being given in terms of the lower-limit distance $r_{min}$ of coordinates from the disk rotation center and the upper-limit distance $r_{max}$ of coordinates from the disk rotation center, as:

$$0 \leq m < M,$$

and $$N[r_{min}^2/2\pi a^2-mq/(MN)] \leq n \leq (r_{max}^2/2\pi a^2-mq/(MN)],$$

where a is given in terms of the field center distance $r_c$ from the rotation center of said rotational disk, as:

$$a=r_c(N/M)^{1/2},$$

and where q has a non-zero value.

6. A confocal scanning microscope according to claim 5, wherein said rotational disk has an arrangement of pinholes with a relatively large diameter in an outer annular region and pinholes with a relatively small diameter in an inner annular region.

* * * * *

UNITED STATES PATENT AND TRADEMARK OFFICE
CERTIFICATE OF CORRECTION

PATENT NO.    : 5,734,497

DATED         : March 31, 1998

INVENTOR(S)   : Nobuyuki YANO, deceased, late of Okazaki, by Michiyo YANO, heir; Katsuyasu MIZUNO, Gamagori, both of JAPAN It is certified that error appears in the above-indentified patent and that said Letters Patent is hereby corrected as shown below:

Title page, in item [56] U.S. PATENT DOCUMENTS, please add:

--4,884,880    12/1989    LICHTMAN et al.    359/227--.

Signed and Sealed this

Twenty-third Day of June, 1998

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,734,497
DATED : March 31, 1998
INVENTOR(S) : Yano, et al

It is certified that error appears in the above-identified patent and that said Letters Patent is hereby corrected as shown below:

Column 10, line 24, claim 5:

$$r = a[2\pi\{n/N + mq/(M/N)\}]^{1/2}$$

should read as follows:

$$r = a[2\pi\{n/N + mq/(MN)\}]^{1/2}$$

Signed and Sealed this

Second Day of March, 1999

*Attest:*

Q. TODD DICKINSON

*Attesting Officer*     *Acting Commissioner of Patents and Trademarks*